Sept. 24, 1963　　　M. B. OSBORNE　　　3,104,753
ARTICLE-HANDLING MACHINES
Filed June 7, 1961　　　　　　　　　　　　2 Sheets-Sheet 2

INVENTOR:
MICHAEL BRYON OSBORNE
BY
Mead, Browne, Schuyler Beveridge
Attorneys 3,104,753
ARTICLE-HANDLING MACHINES
Michael Bryon Osborne, Cottingham, England, assignor to The Thomas Hill Engineering Company (Hull) Limited, Yorkshire, England, a British company
Filed June 7, 1961, Ser. No. 115,499
Claims priority, application Great Britain June 15, 1960
4 Claims. (Cl. 198—30)

This invention concerns article-handling machines, and relates more especially to machines for handling relatively small articles such as bottles, jars and other containers, and objects of a like nature or size.

In connection with the various operations, such as cleaning, filling and closing, to which bottles and other containers are subjected, it is often necessary, in order that such operations may be carried out at an economically high speed, to arrange an initially random supply of the containers into an orderly and substantially uniform sequence. For example, in feeding bottles to a filling or capping station, it is necessary that the bottles shall approach the station in single file, and shall be in at least reasonably uniform spacing. This requirement presents relatively little difficulty where the containers are round or substantially so, but where they are of polygonal or oval or similar cross-section, attempts to convey the initially random arrangement through or past guide members intended to guide the said containers into a regular sequence usually fail due to the fact that in neighbouring containers, the flat faces or those with the less pronounced curvature come into abutment during the course of the movement and, in effect, lock together in that relationship, with the result that jamming occurs.

According to the present invention, an article-handling machine comprises a loading station for receiving supplies of articles in random arrangement, a plurality of driven conveyor means for conveying said articles from said loading station to a delivery station, and means for transferring said articles from one conveyor means to another during passage of said articles through said machine, said conveyor means and said transfer means cooperating to effect intermittent rotary motion of said articles on their bases and to present said articles in regular sequence to said delivery station. In this way, by virtue of the intermittent rotary motion of the articles, jamming and consequent blockages of the articles travelling through the machine are avoided.

Preferably the conveyor means comprise a plurality of endless conveyors, some of which have a speed differential relative to their neighbours, arranged immediately adjacent one another in parallel, side-by-side relation, with the upper runs of said conveyors all lying in substantially the same plane, and the loading station being located at one side of said conveyors. These conveyors are preferably arranged in two groups, one group being driven in one direction and receiving articles from the loading station, and the second group being arranged immediately adjacent to the first group on the side thereof remote from the loading station and adapted to feed the sequentially arranged articles to the delivery station. The loading station may be a multiple-position station, the first group of conveyors then conveniently comprising as many individual conveyors as there are positions in said loading station. In such an arrangement, the transfer means may conveniently be one or more guide walls directed generally transversely across the two groups of conveyors, and preferably each guide wall itself consists of an endless belt positioned across the horizontal conveyors so as to intercept oncoming articles, with the article-intercepting surface of said belt lying in an upright plane.

The invention will be described further, by way of example, with reference to the accompanying generally diagrammatic drawings, in which.

Figure 1:
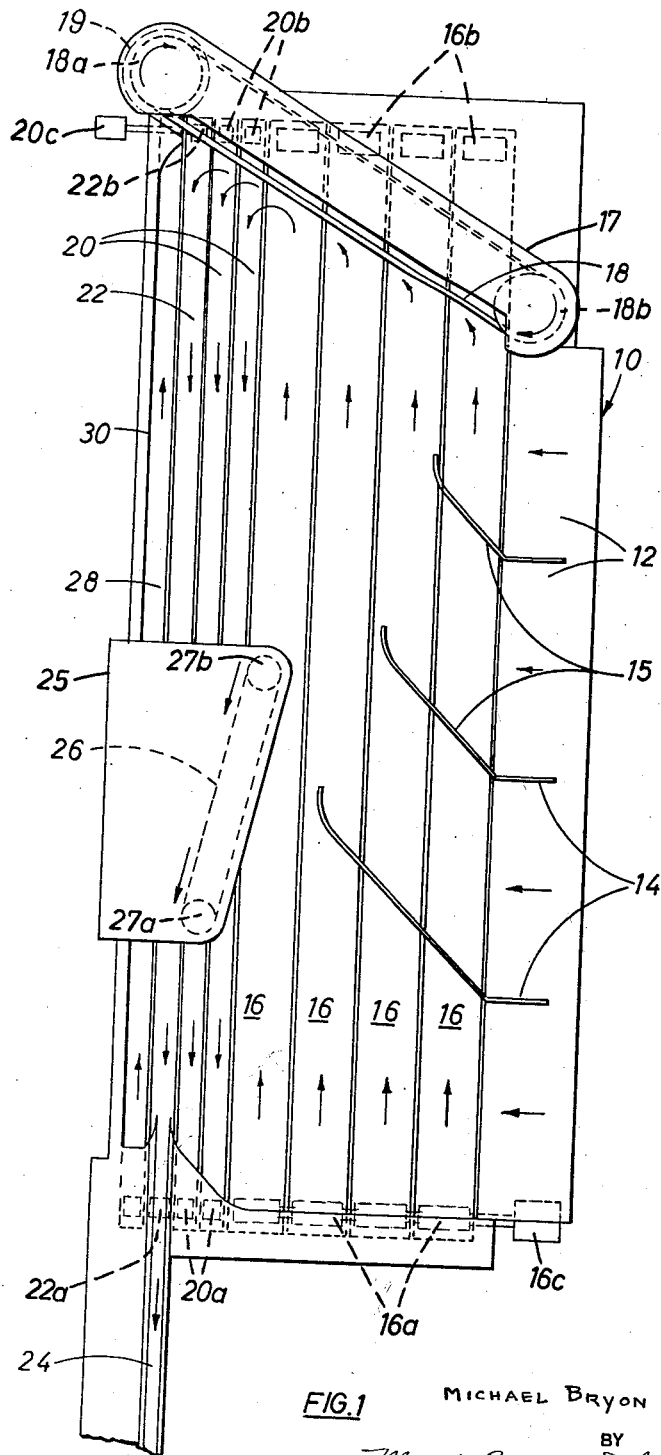
FIG. 1 is a plan view of a bottle-handling machine embodying the invention.

In the machine shown in FIG. 1 of the drawings, a loading station generally designated 10 is arranged at one side of the machine and has four individual loading positions 12 separated from one another by baffles 14. Alongside the loading station 10 is mounted a first group of four endless conveyors 16, carried on driving and return drums 16a and 16b, and arranged in parallel, side-by-side relation corresponding one each to one of the loading positions 12. The driving drums 16a are driven by an electric motor 16c. Each of the baffles 14 has a portion 15 extending generally diagonally across the conveyors 16 in the direction of movement thereof, with each successive baffle portion 15 being somewhat longer than the one preceding it, so that bottles from any given loading position 12 will automatically be guided on to the conveyor 16 associated with that position.

The conveyors 16 are all driven at the same speed, and carry the bottles which are guided on to them towards one end of the machine, where there is provided a moving, primary transfer belt 18 which is arranged on its edge to present a bottle-intercepting surface lying in a plane substantially perpendicular to that of the conveyors 16, and which is driven by an electric motor diagrammatically indicated at 19 in such a direction as to carry intercepted bottles across the conveyors 16 away from the loading station 10. It will be noted that the belt 18 is directed generally transversely across the conveyors 16, but has a somewhat diagonal inclination relative to these conveyors, in the direction of travel thereof. The function of the belt 18, in addition to transferring the bottles across the conveyors 16, is also to impart a rotary motion to at least some of said bottles in order to turn them slightly on their bases, and prevent jamming if they are of polygonal or other troublesome shape; and in this connection, the angle of inclination of the belt 18 to the conveyors 16 is of some importance. Preferably it is of the order of 30°, as shown in the drawing, but in order to cater for different operational uses, some appropriate conventional means may conveniently be provided to enable the belt 18 to be swung, say about one of its driving pulleys, thereby to render the said inclination variable.

From the first group of conveyors 16, the belt 18 carries the bottles on to a second group comprising further endless conveyors 20 and 22, all of which are arranged in parallel, side-by-side relationship with one another and with the conveyors 16, with the upper runs of all the conveyors lying in the same plane. The conveyors 20 and 22, which are respectively carried on driving and return drums 20a, 20b, 22a and 22b, will be seen to be moving in the opposite direction to the conveyors 16, and are driven by an electric motor 20c with the outer conveyor 22, which leads to a delivery station 24, moving more quickly than the two inside conveyors 20, whose speed is commensurate with that of the conveyors 16. As they are carried along by the belt 18, the bottles passing from the conveyors 16 firstly move on to the conveyors 20, thus experiencing an abrupt change of direction, and as a result of the oppositely directed forces which at that instant are momentarily applied to its base, each bottle is again given a slight turning movement. At this stage, that is to say, at or about the beginning of the upper runs of the second group of conveyors, some of the bottles will also pass completely across the conveyors 20 and on to the conveyor 22, when the speed differential between the two again imparts a turning motion to the bottles crossing the conveyors. Those bottles which remain on the conveyors 20, however, are carried along until they encounter a second transfer belt 26, similar to the primary belt 18, and which is arranged to transfer the said bottles on to the conveyor 22, where they join in single file with such bottles as are already present on that conveyor. The second transfer belt 26 will be seen to have an important function in combining the multi-line flow of bottles on the conveyors 20 and 22 into a single continuous line on the fast output conveyor 22.

As a safeguard, a return conveyor 28 is arranged alongside the final conveyor 22, and any bottles which, for any reason, are pushed off the conveyor 22 are carried back to the beginning of that conveyor. A guard wall 30 is provided along the length of the conveyor 28 and is inwardly bent at its end in order to pass returned bottles back on to the conveyor 22.

In the use of the machine proposed by the invention, each loading position 12 is staffed by an operator, to whom bottles packed in an inverted condition in crates or boxes are delivered. The operator inverts each crate or box on to the loading station, thus bringing the bottles into an upright condition, and pushes the said bottles in any order towards the conveyors 16. As already described, in passing from the four conveyors 16 to the two conveyors 20 and thence to the single, final conveyor 22, the bottles are brought into single file and, dependent to some extent upon the relative speeds of the various conveyors and transfer belts, are presented to the delivery station 24 in more or less regular sequence. Preferably, means are provided for controlling the said speeds, and also for controlling the inclination of the transfer belt 26 relative to the conveyors 20 and 22. Finally, by virtue of the occasional turning movements imparted to the bottles as a result of speed differentials between the various conveyors and as a result of the action of the transfer belts 18 and 26, jamming of the bottles is prevented, and thereby the machine may be used to handle bottles having flat faces or other non-circular shapes.

It will be clear that although the machine shown in the drawing has been described as being for the handling of bottles, suitable dimensioning and, if necessary, minor modification to the shape of such members as the baffles 14, the guard wall 30 and the delivery station 24 will enable a wide range of other articles to be handled.

Various modifications are, of course, possible within the scope of the invention. For example, instead of driving all the conveyors 16 at the same speed, speed differentials between the individual conveyors 16 (all being driven in the same direction) may be introduced for some applications. However, if uniform speed is to be imparted to all the articles received from the loading station 10, then a single conveyor of appropriately greater width may be substituted for the individual conveyors 16 shown. Again, it is not imperative to provide separate output conveyors 20 and 22, if a lower output speed than that envisaged by the invention is acceptable. It will also be appreciated, that although the conveyors 16 have been shown as moving in the opposite direction to the conveyors 20 and 22, all the conveyors could be driven in the same direction if circumstances so dictated, although naturally much of the compactness achieved by the illustrated contra-working would be lost.

Figure 2:
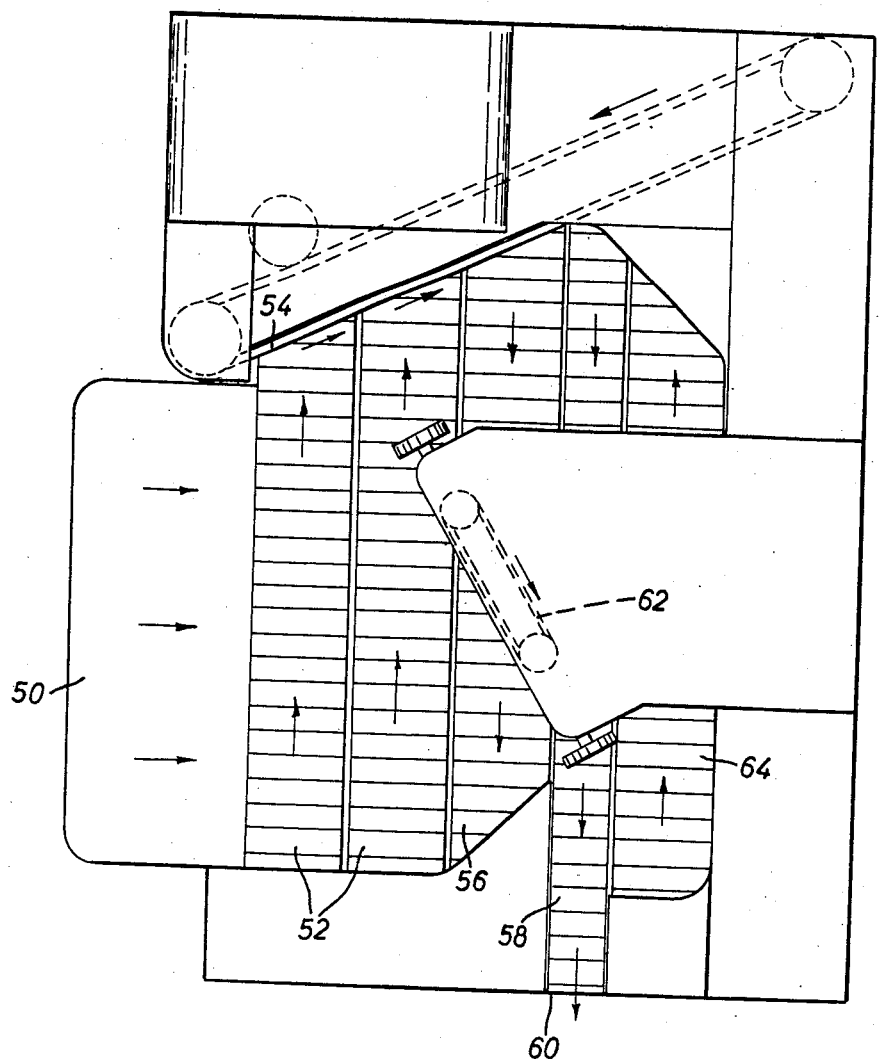
FIG. 2 is a plan view of another embodiment of bottle-handling machine.

As indicated above, where a lower output speed is acceptable, the number of conveyors employed may be reduced, and this feature, together with a number of other simplications, is shown in FIG. 2 of the drawings.

In FIG. 2, a single position loading station 50 is arranged adjacent a first group of conveyors consisting of two parallel conveyors 52 which are driven at the same speed as one another, in a manner similar to that of the conveyors 16 of FIG. 1. Bottles moved from the loading station 50 on to the conveyors 52 thus pass down the machine towards a primary transfer belt 54 which presents a moving, bottle-intercepting surface substantially perpendicular to the surface of the conveyors 52, and which, similarly to the belt 18 of FIG. 1 is driven in a direction which urges intercepted bottles across the conveyors 52 towards an oppositely moving, adjoining conveyor 56, at the same time intermittently rotating the bottles on their bases. Adjacent the other side of the conveyor 56 is a faster-moving discharge conveyor 58 driven in the same direction as conveyor 56 and directed towards a discharge station 60, and a secondary transfer belt 62 which is inclined across the two conveyors 56 and 58 and which is similar to the belt 54, is provided to urge bottles carried along by the conveyor 56 to move on to the conveyor 58. A return conveyor 64 is arranged alongside the discharge conveyor 58 for returning to the beginning of the latter, any bottles which may be displaced off it.

In typical bottle-handling machines embodying the invention, it has been found that the preferred speed ratio, in terms of linear speed, between all the conveyors is 1:1, with the exception of the discharge or unloading conveyors 22 of FIG. 1 and 58 of FIG. 2, which preferably have a speed ratio of 1½:1 relative to the remaining conveyors. The discharge conveyors may, however, have a speed ratio relative to the remaining conveyors within the range 1:1 to 3:1. In the case of the transfer belts, that is to say the primary and secondary transfer belts 18 and 26 of FIG. 1 and the corresponding belts 54 and 62 of FIG. 2, the primary belts are preferably driven at a speed ratio of 1:1 relative to the slower conveyors, and the secondary belts at a speed ratio of 2:1. The primary transfer belt speed, however, is not at all critical, and may be up to twice that of the slower conveyors, whilst the secondary transfer belt speed ratio may be in the range 1:1 to 4:1.

The angle of inclination of the primary transfer belt relative to the paths of the conveyors is not particularly critical, whilst the angle of inclination of the secondary belt is important principally because the lower it is, the longer must be the overall length of the machine, and the higher must be the linear transfer speed of the belt. Similarly, the greater is the angle of inclination of the secondary belt, the greater is the braking effect on bottles intercepted by it. For these reasons, it has been found convenient to arrange the angle of inclination of the primary transfer belt relative to the conveyor paths to be about 65°, and the angle of inclination of the secondary belt within the range 20° to 70°, preferably about 30°.

I claim:

1. An article-handling machine comprising a loading station for receiving articles in random arrangement, a delivery station remote from said loading station, a plurality of endless driven conveyors arranged in parallel, side-by-side relation for conveying said articles from said loading station to said delivery station, said conveyors including a first group thereof arranged immediately adjacent said loading station and driven in one direction, and a second group thereof positioned immediately adjacent said first group on the side of said first group remote from said loading station, said second group of conveyors being driven in the opposite direction and including a discharge conveyor of substantially less width than the conveyors of said first group and terminating in said delivery station, first guide means including an article-intercepting surface obliquely traversing at least said first group of conveyors for directing articles on said first group towards said second group of conveyors, and second guide means comprising a driven endless belt having its major surface in a plane perpendicular to the plane of the conveyors and obliquely traversing said second group of conveyors to terminate tangentially of said discharge conveyor, said belt being driven at a higher linear speed than that of said conveyor for directing articles received by said second group of conveyors in a common attitude on to said discharge conveyor, said first and second guide means co-operating with their respectively associated conveyors to exert a rotary moment on each article while it is intercepted by said guide means whereby to effect occasional rotary motion of said articles on their bases and maintain freedom of movement of said articles relative to one another, and said discharge conveyor passing directly from its tangential junction with said article-intercepting surface to said delivery station.

2. An article-handling machine as set forth in claim 1, wherein said first guide means comprises a driven endless belt having its major surface in a plane perpendicular to the plane of the conveyors, said belt being driven in the same sense as said first group of conveyors whereby to urge intercepted articles in a direction from said first conveyors towards said second conveyors.

3. An article-handling machine as set forth in claim 1, wherein the discharge conveyor is driven at a higher speed than the remaining conveyors.

4. An article-handling machine as set forth in claim 1, wherein a return conveyor is positioned immediately adjacent the side of the discharge conveyor remote from the remaining conveyors of said second group, and is driven in a direction opposite to that of said second group for returning to the input end of said discharge conveyor, any articles which are dislodged therefrom in advance of said delivery station.

References Cited in the file of this patent

UNITED STATES PATENTS

| | | |
|---|---|---|
| 2,560,995 | Stiles | July 17, 1951 |
| 2,763,359 | Rose | Sept. 18, 1956 |

FOREIGN PATENTS

| | | |
|---|---|---|
| 623,482 | Great Britain | May 18, 1949 |